(12) United States Patent
Askerdal

(10) Patent No.: US 12,359,930 B2
(45) Date of Patent: Jul. 15, 2025

(54) PROCESSING UNIT AND METHOD THEREIN FOR ENABLING RELIABLE RANGE ESTIMATIONS FOR A VEHICLE ALONG A ROUTE

(71) Applicant: VOLVO TRUCK CORPORATION, Gothenburg (SE)

(72) Inventor: Mikael Askerdal, Åsa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 261 days.

(21) Appl. No.: 18/156,169

(22) Filed: Jan. 18, 2023

(65) Prior Publication Data

US 2023/0228581 A1 Jul. 20, 2023

(30) Foreign Application Priority Data

Jan. 20, 2022 (EP) .................................. 22152425

(51) Int. Cl.
*G01C 21/34* (2006.01)
*G01C 21/36* (2006.01)
*H04W 4/44* (2018.01)

(52) U.S. Cl.
CPC ..... *G01C 21/3469* (2013.01); *G01C 21/3492* (2013.01); *G01C 21/3691* (2013.01); *H04W 4/44* (2018.02)

(58) Field of Classification Search
CPC ............ G01C 21/3469; G01C 21/3492; G01C 21/3691; B60W 60/0023
(Continued)

(56) References Cited

U.S. PATENT DOCUMENTS 8,554,473 B2 * 10/2013 Arcot ................. G01C 21/3492
701/414
8,645,052 B2 * 2/2014 Pryakhin ................. G01C 21/26
701/123
(Continued)

FOREIGN PATENT DOCUMENTS

| CN | 111483322 A | 8/2020 |
|---|---|---|
| CN | 112406630 A | 2/2021 |
| DE | 102019129807 A1 | 5/2021 |

OTHER PUBLICATIONS

Extended European Search Report in corresponding European Application No. 22152425.9 dated Jul. 20, 2022 (10 pages).
(Continued)

*Primary Examiner* — Phutthiwat Wongwian
*Assistant Examiner* — Brian R Kirby
(74) *Attorney, Agent, or Firm* — Venable LLP; Jeffri A. Kaminski

(57) ABSTRACT

A processing unit segments the route into a plurality of sections. It is, for each section, obtains a set of route section characteristic values, $R_{SCV}$, that will impact the energy consumption of the vehicle whilst driving within the section, obtains a set of vehicle energy consumption values, $V_{ECV}$, that will impact the energy consumption of the vehicle whilst driving within the section at least partly based on $R_{SCV}$, estimates a first probability distribution, $P_1$, of the energy consumption for the vehicle whilst driving within the section based on $R_{SCV}$, $V_{ECV}$, and a first set of traffic information values, $T_1$, within the section, estimates a second probability distribution, $P_2$, of the energy consumption for the vehicle whilst driving within the section based on $R_{SCV}$, $V_{ECV}$, and a second set of traffic information values, $T_2$, within the section, estimates a traffic flow indicator, $I_{TF}$, for the section based on $R_{SCV}$, $V_{ECV}$ and a third set of traffic information values, $T_3$, within the section, and determines a (Continued)

route section probability distribution, $P_{RS}$, of the energy consumption for the vehicle whilst driving within the section based on the relation between $I_{TF}$, $P_1$, and $P_2$.

15 Claims, 2 Drawing Sheets

(58) Field of Classification Search
USPC .......................................................... 701/123
See application file for complete search history.

(56) References Cited

U.S. PATENT DOCUMENTS

| | | | |
|---|---|---|---|
| 8,755,993 B2 * | 6/2014 | Calkins | G01C 21/3469 |
| | | | 701/410 |
| 10,048,082 B2 * | 8/2018 | Meyer | G01C 21/3469 |
| 10,604,156 B2 * | 3/2020 | Sorstedt | B60W 60/001 |
| 2010/0305839 A1 * | 12/2010 | Wenzel | G08G 1/0104 |
| | | | 701/123 |
| 2016/0061611 A1 | 3/2016 | Meyer et al. | |
| 2016/0061616 A1 * | 3/2016 | Meyer | G01C 21/3469 |
| | | | 701/123 |
| 2016/0097652 A1 * | 4/2016 | Liu | G01C 21/3469 |
| | | | 701/423 |
| 2018/0029500 A1 * | 2/2018 | Katanoda | G01C 21/26 |
| 2018/0045526 A1 * | 2/2018 | Trancik | G06Q 50/40 |
| 2018/0082495 A1 | 3/2018 | Koebler et al. | |
| 2019/0293443 A1 | 9/2019 | Kelly et al. | |
| 2022/0146272 A1 * | 5/2022 | Verma | G01C 21/3446 |

OTHER PUBLICATIONS

Adam Thor Thorgeirsson et al; "Probabilistic Prediction of Energy Demand and Driving Range for Electric Vehicles With Federated Learning"; Probabilistic Prediction of Energy Demand and Driving Range; Institute of Electrical and Electronics Engineers (IEEE) Open Journal of Vehicular Technologu, IEEE vol. 2; Date of publication Mar. 11, 2021; DOI:10.1109/OJVT.2021.3065529; pp. 151-161 (11 pages).

Sogol Kharrazi et al.; "Driving Behavior Categorization and Models for Generation of Mission-based Driving Cycles"; Published in: 2019 IEEE Intelligent Transportation Systems Conference (ITSC); Date of Conference: Oct. 27-30, 2019; Conference Location: Auckland, New Zealand; DOI: 10.1109/ITSC.2019.8916871; pp. 1349-1354 (6 pages).

* cited by examiner

PROCESSING UNIT AND METHOD THEREIN FOR ENABLING RELIABLE RANGE ESTIMATIONS FOR A VEHICLE ALONG A ROUTE

TECHNICAL FIELD

Embodiments herein relate in general to range estimations for a vehicle. In particular, embodiments herein relate to a processing unit and a method therein for enabling reliable range estimations for a vehicle along a route from a source location to a target destination. Also, embodiments herein also relate to a computer program product, a carrier and a vehicle comprising the processing unit.

BACKGROUND

One of the main problems to be solved in relation to battery electric vehicles, BEVs, is to estimate how much energy that is needed for the BEV to reach a certain target destination from its current location. This is because in contrast to Internal Combustion Engine, ICE, vehicles in which the fuel consumption to a certain target destination may be easily determined, the energy need of a BEV and range estimation may differ greatly dependent on several different factors.

The different factors may, for example, be divided into four main categories. The first main category may concern the vehicle itself. This may comprise factors such as the vehicle mass, the vehicle tires, aerodynamics of the vehicle, the powertrain efficiency of the vehicle, etc. The second main category may concern a speed profile of the vehicle. A speed profile of a vehicle is commonly estimated from one or more reference speed value (such as, e.g. the different road speed limitations along the determined route) combined with current or expected weather and traffic information. The third main category may concern the road resistance along the route. This may comprise factors such as the road gradients (e.g. flat roads, uphill roads or downhill roads) and road surface conditions (e.g. cold weather road conditions, wet weather road conditions, sunny weather road conditions, etc.). The fourth main category may concern auxiliary energy consumption of the vehicle. This may comprise all on-board energy consumption that does not contribute to the propulsion of the vehicle (e.g. climate control systems, thermal energy storage systems, air pressure systems, Power Take-off, PTO, systems, etc.). Based on standard vehicle dynamics formulas associated with these four categories, an energy consumption value of the vehicle for the route may be estimated. Examples of such standard vehicle dynamics formulas may, for example, be found in S. Kharrazi, "Driving Behavior Categorization and Models for Generation of Mission-based Driving Cycles", 2019 IEEE Intelligent Transport System Conference. Another option is to exchange the standard vehicle dynamics formulas, entirely or partially, with machine-learning algorithms being trained on data from vehicles that previously has travelled along the same or similar roads of the route.

However, due to the volatile nature or changeability in the data concerning all these different factors, it should be noted that the estimated energy consumption value of the vehicle for the route is equally volatile and changeable and therefore not a particularly reliable estimate. Furthermore, performing continuous re-calculations of the estimated energy consumption value along the route also significant increases the processing load and power consumption on any on-board processing system and puts high requirements on its processing capability. This may lead to non-feasible or unrealistic, high cost implementations. Hence, there is a need to provide an efficient and reliable estimation of the energy consumption of a vehicle along a route in order to enable a reliable range estimation.

SUMMARY

It is an object of embodiments herein to provide a processing unit and method therein, along with computer program products and a vehicle, for enabling reliable range estimation synchronous remote vehicle diagnostics for a plurality of vehicles that seeks to mitigate, alleviate, or eliminate all or at least some of the above-discussed drawbacks of presently known solutions.

According to a first aspect of embodiments herein, the object is achieved by a method in a processing unit for enabling reliable range estimations for a vehicle along a route from a source location to a target destination. The method comprises segmenting the route into a plurality of sections. The method also comprises, for each section, perform the following steps: obtaining a set of route section characteristic values, $R_{SCV}$, that will impact the energy consumption of the vehicle whilst driving within the section, obtaining a set of vehicle energy consumption values, $V_{ECV}$, that will impact the energy consumption of the vehicle whilst driving within the section at least partly based on $R_{SCV}$, estimating a first probability distribution, $P_1$, of the energy consumption for the vehicle whilst driving within the section based on $R_{SCV}$, $V_{ECV}$, and a first set of traffic information values, $T_1$, within the section, estimating a second probability distribution, $P_2$, of the energy consumption for the vehicle whilst driving within the section based on $R_{SCV}$, $V_{ECV}$, and a second set of traffic information values, $T_2$, within the section, estimating a traffic flow indicator, $I_{TF}$, for the section based on $R_{SCV}$, $V_{ECV}$ and a third set of traffic information values, $T_3$, within the section, and determining a route section probability distribution, $P_{RS}$, of the energy consumption for the vehicle whilst driving within the section based on the relation between $I_{TF}$, $P_1$, and $P_2$. The method further comprises determining a route probability distribution, $P_R$, of the energy consumption for the vehicle whilst driving along the route based on the estimated $P_{RS}$ for all sections.

By splitting the calculation of the energy consumption of the vehicle into factors that may be calculate separately, i.e. for each route section, instead of for the entire route and by estimating energy consumption probability distributions instead of distinct values, a significant reduction is the number of recalculations of the energy consumption of the vehicle along the route due to changes in different conditions is achieved, while also allowing for asymmetric conditions and large uncertainties in the data of the factors affecting the energy consumption of the vehicle to be handled. Furthermore, merging the different estimated energy consumption probability distributions of each route section will generate a complete estimation of the energy consumption probability distribution for the entire route having the same advantages as mentioned above. Hence, an efficient and reliable estimation of the energy consumption of a vehicle along a route is provided that enables a reliable range estimation of the vehicle to be obtained.

In some embodiments, the method may further comprise determining one or more range estimations having a determined level of reliability for the vehicle along the route based on the estimated $P_R$. This means for example that a confidence value on the range estimations may be set or configured, such as, for example, setting the confidence to 95% for the range estimation of the vehicle along the route in case of normal route mission operation (e.g. standard delivery), or an increased confidence of 98% in case of sensitive or important route mission operations (e.g. organ transportation, transporting refrigerated goods, etc.). This may then, for example, be used is in determining the expected range to be indicated to a driver of the vehicle. According to some embodiments, the estimation of $P_1$, $P_2$ and $I_{TF}$ may comprise obtaining an expected value and a variance value for the energy consumption for the vehicle by adding uncertainty values for one or more of $R_{sc}v$ and $V_{ECV}$, as well as, $T_1$, $T_2$, and $T_3$.

In some embodiments, $R_{SCV}$ may comprise one or more of: one or more road resistance values within the section, one or more road weather condition values within the section, one or more road reference speed values within the section, and a travel time for the section. Also, in some embodiments, $T_1$ may comprise one or more of: one or more speed limitations set within the section, one or more static traffic rules applied within the section, one or more speed bump occurrences within the section, traffic intensity values within the section indicating a best case scenario according to previously stored traffic intensity values for the section, speed average values of vehicles within the section indicating a best case scenario according to previously stored speed average values for the section, and speed variance values of vehicles within the section indicating a best case scenario according to previously stored speed variance values for the section. Further, in some embodiments, $T_2$ may comprise one or more of: traffic intensity values within the section indicating a worst case scenario according to previously stored traffic intensity values for the section, speed average values of vehicles within the section indicating a worst case scenario according to previously stored speed average values for the section, and speed variance values of vehicles within the section indicating a worst case scenario according to previously stored speed variance values for the section. Here, according to some embodiments, the best case scenario may be represented by a combination of one or more of the lowest traffic intensity values, the highest speed average values, and the lowest speed variance values, and the worst case scenario may be represented by a combination of one or more of the highest traffic intensity values, the lowest speed average values, and the highest speed variance values. This enables energy consumption probability distributions to be calculated that incorporate "no traffic" scenarios, as well as, a "follow the current traffic flow" scenarios.

Furthermore, in some embodiments, $T_3$ may comprise one or more of: an estimated traffic value for the section indicating the current traffic situation in the section, an estimated current travel time for the section, and one or more additional estimated traffic values for the section indicating previous traffic situations in the section. According to some embodiments, one or more of $R_{SCV}$, $T_1$, $T_2$, and $T_3$ may be obtained from a server accessible via wireless communications network. This means that some information may be pre-processed elsewhere and retrieved on-demand.

In some embodiments, $V_{ECV}$ comprise one or more of: characteristic values of the vehicle that will impact the energy consumption of the vehicle whilst driving within the section, and energy consumption values of auxiliary systems on-board the vehicle. In this case, the characteristic values of the vehicle comprises one or more of: a mass value of the vehicle, tire characteristic values of the vehicle, aerodynamic values of the vehicle, and characteristic values of powertrain of the vehicle.

According to some embodiments, the processing unit may be located in a remote server accessible via wireless network. In this case, the method may also comprise transmitting the determined one or more range estimations to the vehicle. This means that the complete processing of the range estimation may be outsourced or performed in a connected server or cloud-solution accessible via a wireless communications network.

According to a second aspect of embodiments herein, the object is achieved by a processing unit for enabling reliable range estimations for a vehicle along a route from a source location to a target destination. The processing unit is configured to segment the route into a plurality of sections. The processing unit is also configured to, for each section, obtain a set of route section characteristic values, $R_{SCV}$, that will impact the energy consumption of the vehicle whilst driving within the section. The processing unit is further configured to obtain a set of vehicle energy consumption values, $V_{ECV}$, that will impact the energy consumption of the vehicle whilst driving within the section at least partly based on $R_{SCV}$. Also, the processing unit is configured to estimate a first probability distribution, $P_1$, of the energy consumption for the vehicle whilst driving within the section based on $R_{SCV}$, $V_{ECV}$, and a first set of traffic information values, $T_1$, within the section. Further, the processing unit is configured to estimate a second probability distribution, $P_2$, of the energy consumption for the vehicle whilst driving within the section based on $R_{SCV}$, $V_{ECV}$, and a second set of traffic information values, $T_2$, within the section. Furthermore, the processing unit is configured to estimate a traffic flow indicator, $I_{TF}$, for the section based on $R_{SCV}$, $V_{ECV}$ and a third set of traffic information values, $T_3$, within the section and determine a route section probability distribution, $P_{RS}$, of the energy consumption for the vehicle whilst driving within the section based on the relation between $I_{TF}$, $P_1$, and $P_2$. Finally, the processing unit is additionally configured to determine a route probability distribution, $P_R$, of the energy consumption for the vehicle whilst driving along the route based on the estimated $P_{RS}$ for all sections.

In some embodiments, the processing unit may be configured to determine one or more range estimations having a determined level of reliability for the vehicle along the route based on the estimated $P_R$. In some embodiments, the processing unit may be configured to estimate $P_1$, $P_2$ and $I_{TF}$ by determining an expected value and a variance value for the energy consumption for the vehicle by adding uncertainty values for one or more of $R_{SCV}$ and $V_{ECV}$, as well as, $T_1$, $T_2$, and $T_3$.

In some embodiments, $R_{SCV}$ comprise one or more of: one or more road resistance values within the section, one or more road weather condition values within the section, one or more road reference speed values within the section, and a travel time for the section. In some embodiments, $T_1$ comprise one or more of: one or more speed limitations set within the section, one or more static traffic rules applied within the section, one or more speed bump occurrences within the section, traffic intensity values within the section indicating a best case scenario according to previously stored traffic intensity values for the section, speed average values of vehicles within the section indicating a best case scenario according to previously stored speed average values for the section, and speed variance values of vehicles within the section indicating a best case scenario according to previously stored speed variance values for the section. In some embodiments, $T_2$ comprise one or more of: traffic intensity values within the section indicating a worst case scenario according to previously stored traffic intensity values for the section, speed average values of vehicles within the section indicating a worst case scenario according to previously stored speed average values for the section, and speed variance values of vehicles within the section indicating a worst case scenario according to previously stored speed variance values for the section. According to some embodiments, the best case scenario is represented by a combination of one or more of the lowest traffic intensity values, the highest speed average values, and the lowest speed variance values, and the worst case scenario is represented by a combination of one or more of the highest traffic intensity values, the lowest speed average values, and the highest speed variance values.

In some embodiments, $T_3$ comprise one or more of: an estimated traffic value for the section indicating the current traffic situation in the section, an estimated current travel time for the section, and one or more additional estimated traffic values for the section indicating previous traffic situations in the section. Further, in some embodiments, the processing unit may be configured to obtain one or more of $R_{SCV}$, $T_1$, $T_2$, and $T_3$ from a server accessible via wireless communications network.

In some embodiments, $V_{ECV}$ comprise one or more of: characteristic values of the vehicle that will impact the energy consumption of the vehicle whilst driving within the section, and energy consumption values of auxiliary systems on-board the vehicle. In some embodiments, the characteristic values of the vehicle comprises one or more of: a mass value of the vehicle, tire characteristic values of the vehicle, aerodynamic values of the vehicle, and characteristic values of a powertrain of the vehicle.

In some embodiments, the processing unit may be located in a remote server accessible via wireless network. In this case, the processing unit may be configured to transmit the determined one or more range estimations to the vehicle.

According to a third aspect of the embodiments herein, the object is achieved by a computer program comprising instructions which, when executed in a processing circuitry, cause the processing circuitry to carry out the methods described above. According to a fourth aspect of the embodiments herein, the object is achieved by a carrier containing the computer program described above, wherein the carrier is one of an electronic signal, optical signal, radio signal, or computer-readable storage medium. According to a sixth aspect of the embodiments herein, the object is achieved by a vehicle comprising a processing unit according to the embodiments described above.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
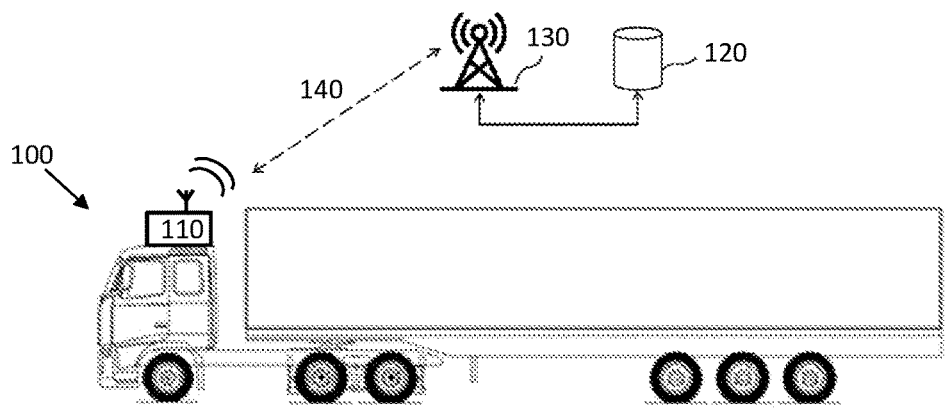
FIG. 1 shows an example of a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates an example of a vehicle 100 where the herein disclosed embodiments may be applied with advantage. In this case, the vehicle 100 is exemplified as a heavy-duty vehicle combination for cargo transport. The vehicle 100 exemplified in FIG. 1 comprises a truck or towing vehicle configured to tow a trailer unit in a known manner, e.g., by a fifth wheel connection. Herein, a heavy-duty vehicle is taken to be a vehicle designed for the handling and transport of heavier objects or large quantities of cargo. The vehicle 100 may further comprise any number of auxiliary systems that are connected to and consumes energy in the vehicle 100. Examples of such auxiliary systems on-board the vehicle 100 may comprise one or more of: electronic control units (ECUs), a climate control system, a thermal Energy Storage System, ESS, an air pressure system, a Power Take-off, PTO, system, and a cabin comfort system, etc. It is appreciated that the embodiments disclosed herein may be applied to a wide variety of electrically powered vehicle units. For example, while the embodiments disclosed herein are also applicable in, for example, rigid trucks, working machines, multi-trailer electric heavy-duty vehicles comprising one or more dolly vehicle units, etc., the embodiments disclosed herein are also applicable for use in any electrically powered vehicle, such as, e.g. any Battery Electric Vehicles, BEVs. Thus, the embodiments herein should not be considered limited to a particular type of vehicle, but should also be considered applicable in other types of vehicles.

A processing unit 110 on the vehicle 100 may be in communication with a remote server 120 via wireless link 140 over an access point 130 that could form part of a cellular access network such as a fifth generation (5G) or sixth generation (6G) wireless access network. The processing unit 110 may comprise processing circuitry, as will be described in more detail below with reference to FIG. 4.

As part of developing the embodiments described herein, it has been realized that one of the underlying problems of providing reliable range estimations is how to handle all of the uncertainties in all of the different factors affecting the energy consumption of vehicle along a determined route. While previously known solutions may be said to address this problem by inefficient continuous re-calculations to obtain an up-to-date single value that estimates the complete energy consumption or range of the vehicle along the route, the embodiments herein provide probabilistic distribution of the energy consumption or range of the vehicle along the route depending on the arrival time. This enables the uncertainties in the different factors to be handled when optimizing the speed of the vehicle, while also enabling reliable measurements on the energy consumption and range estimations. For example, this enables the speed to be optimized towards a maximized expected net energy consumption rather than a minimized energy consumption with set reference speed values.

Figure 2:
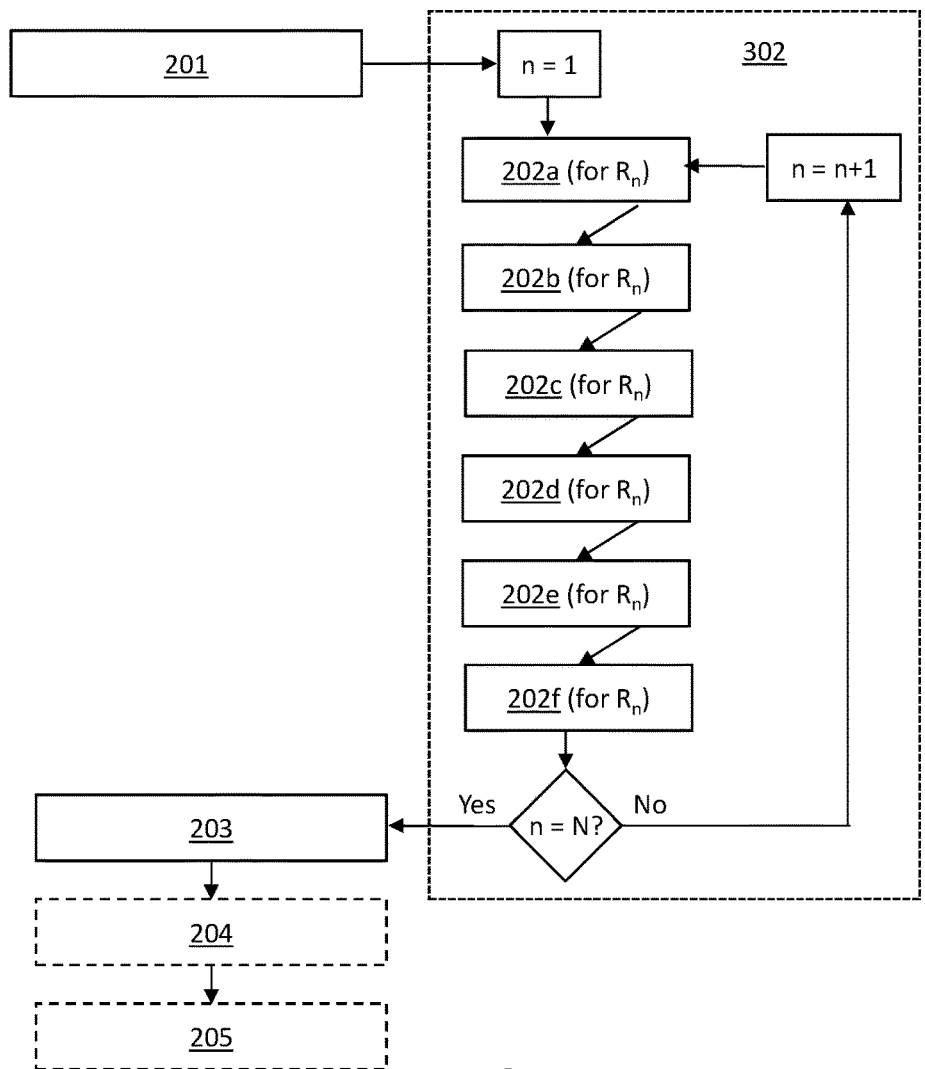
FIG. 2 is a flowchart illustrating embodiments of a method in a processing unit.

Examples of embodiments of a method performed by a processing unit 110 for enabling reliable range estimations for a vehicle 100 along a route R from a source location S to a target destination T, will now be described with reference to the flowchart depicted in FIG. 2. FIG. 2 is an illustrated example of actions, steps or operations which may be performed by the processing unit 110 as described above with reference to FIG. 1. According to some embodiments, the processing unit 110 may be located in the vehicle 100, as described in the example of FIG. 1, but may also be located in the remote server 130 accessible via wireless communications network. The method may comprise the following actions, steps or operations.

Action 201. The processing unit 110 segments the route R into a plurality of sections $R_1$-$R_9$. This may be performed in several different ways, but it is preferable to split the route R into sections where the driving conditions are as homogenous as possible. This means, for example, that a route R may be suitably divided into different shorter sections $R_n$, such as, e.g. the sections $R_1$-$R_9$ shown in FIG. 3, in which the conditions in terms of road resistance may essentially be assumed to be constant, e.g. in regards to constant road slope, constant weather conditions, constant traffic situation, etc. This may advantageously reduce the uncertainties in the calculations for each section. After the segmentation in this action, the processing unit 110 may perform Actions 202a-202f for each segmented section $R_n$. Here, the total number of route sections is denoted by N.

Action 202a. For each section $R_n$, the processing unit 110 obtains a set of route section characteristic values, $R_{SCV}$, that will impact the energy consumption of the vehicle 100 whilst driving within the section $R_n$. This means that, for each section $R_n$, a number of time varying road resistance factors, road weather factors and traffic information factors may be assigned. In some embodiment, the $R_{SCV}$ may comprise one or more of: one or more road resistance values within the section $R_n$, one or more road weather condition values within the section $R_n$, one or more road reference speed values within the section $R_n$, and an expected travel time for the section $R_n$. For example, the road resistance values may comprise: a road gradient value within the section $R_n$, a road surface condition value within the section $R_n$, an air density value within the section $R_n$, a wind speed value within the section $R_n$, and a wind direction indicator value, etc. This may quantify the road resistance conditions for the section $R_n$. Additionally, the one or more road weather condition values may comprise: an ambient temperature value, a sun intensity value, an ambient humidity value, an air pressure value, etc. This may quantify the road weather conditions for the section $R_n$. Further, the one or more road reference speed values may, for example, comprise speed limit values for the road within the section $R_n$ or be an averaged value thereof. Also, the expected travel time for the section $R_n$ may be calculated based on the other route section characteristic values in the set, $R_{SCV}$, according to standard vehicle dynamics formulas known in the art. Here, it should be noted that this set of route section characteristic values, $R_{SCV}$, is vehicle independent and may therefore be collected and stored in a shared server or cloud solution, such as, in a road information hub. Thus, in some embodiments, the set of route section characteristic values, $R_{SCV}$, may be obtained by the processing unit 110 by retrieving it from a remote server 130 accessible via wireless access network.

Action 202b. In addition to obtaining the route section characteristic values, $R_{SCV}$, for the section $R_n$ in Action 202a, the processing unit 110 also obtains a set of vehicle energy consumption values, $V_{ECV}$, that will impact the energy consumption of the vehicle 100 whilst driving within the section $R_n$ at least partly based on $R_{SCV}$. This means that, for each section $R_n$, a number of vehicle energy consumption sensitivity factors may be assigned. These factors may be considered as the main vehicle contributors to the overall vehicle energy consumption. In some embodiments, the $V_{ECV}$ may comprise one or more of: characteristic values of the vehicle 100 that will impact the energy consumption of the vehicle 100 whilst driving within the section $R_n$, and energy consumption values of auxiliary systems on-board the vehicle 100. Information indicating these factors may, in some cases, be stored on in a memory on-board the vehicle 100 or in a vehicle specific server slot in the remote server 130 and be retrievable by the processing unit 110. This information may also be continuously updated in case some of the factors are estimated during operation. Here, according to some embodiments, the characteristic values of the vehicle 100 comprises one or more of: a mass value of the vehicle 100, tire characteristic values of the vehicle 100, aerodynamic values of the vehicle 100, and characteristic values of powertrain of the vehicle 100. For example, the tire characteristic values of the vehicle 100 may comprise a tire rolling resistance coefficient, and characteristic values of powertrain of the vehicle 100 may comprise an efficiency value of the powertrain and/or an energy recuperation capability value.

Action 202c. After obtaining $R_{SCV}$ and $V_{ECV}$ in Actions 202a-202b, the processing unit 110 estimates a first probability distribution, $P_1$, of the energy consumption for the vehicle 100 whilst driving within the section $R_n$ based on $R_{SCV}$, $V_{ECV}$, and a first set of traffic information values, $T_1$, within the section $R_n$. This means that the processing unit 110 may estimate a probability distribution that represent the energy consumption of the vehicle 100 for the section $R_n$ when there is no traffic in the section $R_n$. In other words, $T_1$ and $P_1$ may represent ideal conditions for the vehicle 100 travelling the section $R_n$. Similar to $R_{SCV}$, the traffic information values $T_1$ are vehicle-independent and may, in some cases, be stored on in a memory on-board the vehicle 100 or in the remote server 130 and be retrievable by the processing unit 110. Thus, in some embodiments, the traffic information values, $T_1$, within the section $R_n$ may be obtained by the processing unit 110 by retrieving it from a remote server 130 accessible via wireless access network. This information may also be continuously updated during operation of the vehicle 100.

In this case, the traffic information values, $T_1$, within the section $R_n$ may comprise one or more of: one or more speed limitations set within the section $R_n$, one or more static traffic rules applied within the section $R_n$, one or more speed bump occurrences within the section $R_n$, traffic intensity values within the section $R_n$ indicating a best case scenario according to previously stored traffic intensity values for the section $R_n$, speed average values of vehicles within the section $R_n$ indicating a best case scenario according to previously stored speed average values for the section $R_n$, and speed variance values of vehicles within the section $R_n$ indicating a best case scenario according to previously stored speed variance values for the section $R_n$. Here, it should also be noted that the best case scenario may be represented by a combination of one or more of the lowest traffic intensity values, the highest speed average values, and the lowest speed variance values.

According to one example, the first probability distribution $P_1$ of the energy consumption for the vehicle 100 whilst driving within the section $R_n$ may be determined by setting an expected speed of the vehicle 100 within the section $R_n$ based on the set of route section characteristic values $R_{SCV}$, e.g. the one or more road reference speed values and/or any other values in the set. Using the expected speed of the vehicle 100 within the section $R_n$, the energy consumption of the vehicle 100 within the section $R_n$ may be estimated using a formula similar to Eq. 1:

$$W_{cons} = \frac{m\frac{(v^2(S)-v^2(0))}{2}+mg(h(S)-h(0))+\frac{\rho AS}{2}\left((Dv_{wx}+\bar{v})^2+v_{wy}^2\right)+mgC_\gamma C_{\gamma-road}S_h}{\eta_{pt}}+W_{cons}+W_{brake}(1-\eta_{brake})$$

wherein $W_{cons}$ represent the energy consumption of the vehicle 100 within the section $R_n$;

m represent the mass of the vehicle 100;

v(s) represent the speed of the vehicle 100 as a function of the location s of the vehicle 100;

ρ represent the air density value of the ambient air surrounding the vehicle 100;

g represent the gravitational constant;

h represent the road altitude value of the vehicle 100;

A represent the frontal area of the vehicle 100;

S represent the road length value of the section $R_n$;

$(a+b|\theta|-c\theta^2)$ represent the air drag coefficient depending on the air attack angle relative vehicle motion θ;

$(D_{v_{wx}}+\bar{v})^2+v_{wy}^2)$ represent the air speed depending on the driving direction D of the vehicle 100, the speed v of the vehicle 100 and the wind speed components $v_{wx}$ and $v_{wy}$;

$C_\gamma$ represent the tire rolling resistance coefficient;

$C_{\gamma\text{-}road}$ represent the road surface rolling resistance coefficient, $S_h$ represent the horizontal length value of the section $R_n$;

$\eta_{pt}$ represent the average tank to wheel efficiency;

$W_{brake}$ represent the expected brake energy in the section $R_n$; and $\eta_{brake}$ represent the expected ratio of recuperated brake energy.

In some sections $R_n$, wherein the road surface rolling resistance $C_{\gamma\text{-}road}$ is negative and energy may be can be recuperated, the energy consumption of the vehicle 100 within the section $R_n$ may be estimated using a formula similar to Eq. 2:

$$W_{cons} = \max\left(\frac{\left(m\frac{(v^2(S)-v^2(0))}{2}+mg(h(S)-h(0))+\frac{\rho AS}{2}\left((Dv_{wx}+\bar{v})^2+v_{wy}^2\right)+mgC_\gamma C_{\gamma-road}S_h\right)*v}{S}, P_{cap}\right)\eta_{pt}+W_{aux}$$

wherein $P_{cap}$ is the maximum energy recuperation power of the vehicle's powertrain.

It should be noted that many of the parameters in Eq. 1 and 2 above are not exactly known. However, by adding the uncertainties in each parameter in the Eq. 1 and 2 according to some embodiments herein, an expected value of the energy consumption of the vehicle 100 within the section $R_n$ and a variance in the energy consumption of the vehicle 100 within the section $R_n$ may be determined for the section $R_n$. This means that according to some embodiments, estimating $P_1$ may comprise determining an expected value and a variance value for the energy consumption for the vehicle 100 by adding uncertainty values for one or more of the values in $R_{SCV}$ and $V_{ECV}$. In other words, by assuming that the energy consumption of the vehicle 100 within the section $R_n$ is normal distributed, the first probability distribution $P_1$ of the energy consumption for the vehicle 100 whilst driving within the section $R_n$ may be fully defined by its variance and expected value.

Action 202d. Furthermore, the processing unit 110 may estimate a second probability distribution, $P_2$, of the energy consumption for the vehicle 100 whilst driving within the section $R_n$ based on $R_{SCV}$, $V_{ECV}$, and a second set of traffic information values, $T_2$, within the section $R_n$. This means that the processing unit 110 may estimate a probability distribution that represent the energy consumption of the vehicle 100 for the section $R_n$ when the vehicle 100 adheres to heavy traffic in the section $R_n$. In other words, $T_2$ and $P_2$ may represent non-ideal, or severe, conditions for the vehicle 100 travelling the section $R_n$ at a particular point in time. The traffic information values, $T_2$, within the section $R_n$ may be collected, e.g. at the remote server 130, from other vehicles that has previously travelled within the section $R_n$ during corresponding points in time. Similar to $T_1$, the traffic information values $T_2$ are vehicle-independent and may, in some cases, be stored on in a memory on-board the vehicle 100 or in the remote server 130 and be retrievable by the processing unit 110. Thus, in some embodiments, the traffic information values, $T_2$, within the section $R_n$ may be obtained by the processing unit 110 by retrieving it from a remote server 130 accessible via wireless access network. This information may also be continuously updated during operation of the vehicle 100.

In some cases, the traffic information values, $T_2$, within the section $R_n$ may comprise one or more of: traffic intensity values within the section $R_n$ indicating a worst case scenario according to previously stored traffic intensity values for the section $R_n$, speed average values of vehicles within the section $R_n$ indicating a worst case scenario according to previously stored speed average values for the section $R_n$, and speed variance values of vehicles within the section $R_n$ indicating a worst case scenario according to previously stored speed variance values for the section $R_n$. This means that the processing unit 110 may estimate a probability distribution that represent the energy consumption of the vehicle 100 for the section $R_n$ when the vehicle 100 follows the worst possible traffic in the section $R_n$. In other words, $T_2$ and $P_2$ may represent the worst possible conditions for the vehicle 100 travelling the section $R_n$ at a particular point in time. Here, it should also be noted that the worst case scenario may be represented by a combination of one or more of the highest traffic intensity values, the lowest speed average values, and the highest speed variance values.

According to one example, the second probability distribution, $P_2$, of the energy consumption for the vehicle 100 whilst driving within the section $R_n$ may be determined in the same way as the first probability distribution $P_1$ of the energy consumption for the vehicle 100 whilst driving within the section $R_n$, except in that the expected speed of the vehicle 100 within the section $R_n$ is based on the average speed of the traffic within the section $R_n$. In other words, formulas similar to Eq. 1 and 2 may be used to estimate $P_2$ in a similar manner as when estimating $P_1$ in Action 202c, but instead using the average speed of the traffic within the section $R_n$. Further, in some embodiments, by adding uncertainties in each parameter in the Eq. 1 and 2, an expected value of the energy consumption of the vehicle 100 within the section $R_n$ and a variance in the energy consumption of the vehicle 100 within the section $R_n$ may be determined for the section $R_n$. This means that, according to some embodiments, estimating $P_2$ may comprise determining an expected value and a variance value for the energy consumption for the vehicle 100 by adding uncertainty values for one or more of the values in $R_{SCV}$ and $V_{ECV}$. In other words, by assuming that the energy consumption of the vehicle 100 within the section $R_n$ is normal distributed, the second probability distribution $P_2$ of the energy consumption for the vehicle 100 whilst driving within the section $R_n$ may be fully defined by its variance and expected value.

Action 202e. The processing unit 110 may also estimate a traffic flow indicator, $I_{TF}$, for the section $R_n$ based on $R_{SCV}$, $V_{ECV}$ and a third set of traffic information values, $T_3$, within the section $R_n$. This traffic flow indicator $I_{TF}$ may advantageously be used to determine how the actual traffic situation within the section $R_n$ compares to the ideal conditions assumed in Action 202c and the non-ideal conditions assumed in Action 202d. In some embodiments, the traffic information values, $T_3$, within the section $R_n$ may comprise one or more of: an estimated traffic value for the section $R_n$ indicating the current traffic situation in the section $R_n$, an estimated current travel time for the section $R_n$, and one or more additional estimated traffic values for the section $R_n$ indicating previous traffic situations in the section $R_n$. This means that different factor may be used or averaged to compiled a traffic density value representing the actual traffic situation within the section $R_n$. In some embodiments, the traffic information values, $T_3$, within the section $R_n$ may be obtained by the processing unit 110 by retrieving it from a remote server 130 accessible via wireless access network. This information may also be continuously updated during operation of the vehicle 100.

For example, in some cases, the traffic flow indicator $I_{TF}$ may then be based on this traffic density value, such as, e.g. $I_{TF}=f(td)$ wherein td represents the traffic density. Here, according to some embodiments, a machine learning algorithm or model may be trained to determine the function $f$ based on data comprising a number of vehicle speed profiles for different traffic density values. Generally, it may be seen that a low traffic density value within the section $R_n$ will result in low $I_{TF}$, while a high traffic density value within the section $R_n$ will result in high $I_{TF}$. It should also be noted that the $I_{TF}$ may here be either a deterministic value or represented as a probability distribution. In other words, estimating $I_{TF}$ may comprise determining an expected value and a variance value for the energy consumption for the vehicle 100 by adding uncertainty values for one or more of the values in $R_{SCV}$ and $V_{ECV}$.

Action 202f. The processing unit 110 may further determine a route section probability distribution, $P_{RS}$, of the energy consumption for the vehicle 100 whilst driving within the section $R_n$ based on the relation between $P_1$, $P_2$, and $I_{TF}$. This means that the $I_{TF}$ may be used to interpolate between $P_1$ and $P_2$, to reflect the actual traffic situation within the section $R_n$. For example, if $I_{TF}$ is limited to be within the interval [0, 1], the route section energy consumption for the vehicle 100 whilst driving within the section $R_n$ may be estimated using a formula similar to Eq. 3:

$$W_{section}=\alpha * W_{consFF}+(1-\alpha)W_{consNT}$$

wherein $W_{section}$ is the section energy consumption;
$W_{consFF}$ represents the energy consumption of the vehicle 100 within the section $R_n$ according to Action 202c;
$W_{consNT}$ represents the energy consumption of the vehicle 100 within the section $R_n$ according to Action 202d, and
$\alpha$. represents traffic flow indicator $I_{TF}$.

Here, by adding the uncertainties in Eq. 3 according to some embodiments herein, an expected value of the energy consumption of the vehicle 100 within the section $R_n$ and a variance in the energy consumption of the vehicle 100 within the section $R_n$ may be determined for the section $R_n$. In other words, by assuming that the energy consumption of the vehicle 100 within the section $R_n$ is normal distributed, the route section probability distribution $P_{RS}$ of the energy consumption for the vehicle 100 whilst driving within the section $R_n$ may be fully defined by its variance and expected value.

Action 203. Furthermore, the processing unit 110 may determine a route probability distribution, $P_R$, of the energy consumption for the vehicle 100 whilst driving along the route R based on the estimated $P_{RS}$ for all sections $R_n$. This means that the estimated $P_{RS}$ for all sections $R_n$ may be merged into a complete route probability distribution $P_R$ of the energy consumption for the vehicle 100 whilst driving the route R. This has the advantage of only requiring recalculations of the current section $R_n$ in which the vehicle 110 is travelling instead of recalculating the entire route R. This may significantly reduce the computational load on the processing unit 110.

Figure 3:
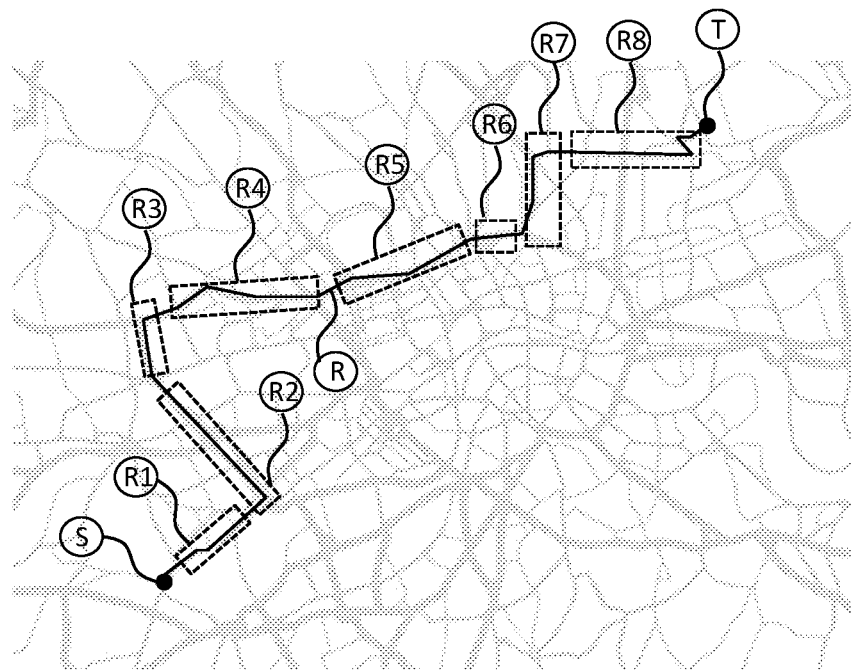
FIG. 3 is a schematic illustration of a map comprising a segmented route according to some embodiments.

For example, the energy consumption for the vehicle 100 whilst driving along the route R from a source location S to a target destination T as shown in FIG. 3, may be determined based on all of the estimated energy consumptions for the vehicle 100 whilst driving within all sections $R_n$. This may be performed by adding up the estimated energy consumptions for all sections $R_n$ along the route R between the source location S to the target destination T in a sum using a formula similar to Eq. 4:

$$W_{route}=\Sigma_a^b W_{section}$$

Since all $W_{sections}$ are assumed to be normal distributed, the route probability distribution, $P_R$, of the energy consumption for the vehicle 100 whilst driving along the route R may be determined based on the expected value and the variance of sum of all $W_{sections}$.

Action 204. After the determination the route probability distribution, $P_R$, in Action 203, the processing unit 110 may determine one or more range estimations having a determined level of reliability for the vehicle 100 along the route R based on the estimated $P_R$. For example, by being able to handle uncertainties, the range estimations herein will obtain a higher level of reliability than other deterministic range estimations.

Action 205. Optionally, in case the processing unit 110 is located in a remote server 130 accessible via wireless communications network, the processing unit 110 may transmit the determined one or more range estimations to the vehicle 100. This means that the processing may advantageously be, at least partly, performed elsewhere according to some embodiments, and not necessarily on-board the vehicle 100.

Figure 4:
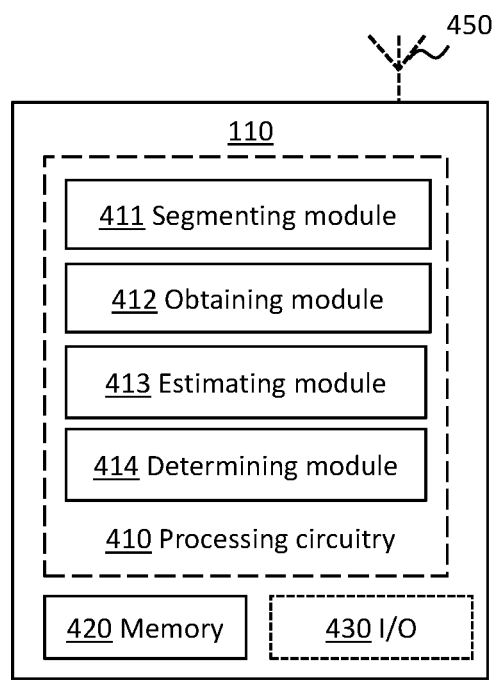
FIG. 4 is a block diagram depicting embodiments of a processing unit.

To perform the method actions for enabling reliable range estimations for a vehicle 100 along a route R from a source location S to a target destination T, the processing unit 110 may comprise the following arrangement depicted in FIG. 4. FIG. 4 shows a schematic block diagram of embodiments of the processing unit 110. It should also be noted that, although not shown in FIG. 4, known conventional features for operating a processing unit 110, such as, for example, a connection to a power source, e.g. a battery or the mains, may be assumed to be comprised in the processing unit 110, but is not shown or described in any further detail in regards to FIG. 4.

The processing unit 110 may comprise processing circuitry 410 and a memory 420. It should also be noted that some or all of the functionality described in the embodiments above as being performed by the processing unit 110 may be provided by the processing circuitry 410 executing instructions stored on a computer-readable medium, such as, e.g. the memory 420 shown in FIG. 4. Alternative embodiments of the processing unit 110 may comprise additional components, such as, for example, an segmenting module 411, an obtaining module 412, an estimating module 413, and a determining 414, whereby each module may be configured and responsible for providing its dedicated functionality to support the embodiments described herein. Here, it should be noted that the obtaining module 411 may form part of, or be connected to, the I/O module 430, or transceiver, for receiving and transmitting data information over a wireless network. The I/O module 430 may also be connected to one or more antennas 450.

The processing unit 110 or processing circuitry 410 is configured to, or may comprise the segmenting module 411 being configured to, segment the route R into a plurality of sections $R_n$. Also, the processing unit 110 or processing circuitry 410 is configured to, or may comprise the obtaining module 412 being configured to, for each section $R_n$, obtain a set of route section characteristic values, $R_{SCV}$, that will impact the energy consumption of the vehicle 100 whilst driving within the section $R_n$. Further, the processing unit 110 or processing circuitry 410 is configured to, or may comprise the obtaining module 412 being configured to, for each section $R_n$, obtain a set of vehicle energy consumption values, $V_{ECV}$, that will impact the energy consumption of the vehicle 100 whilst driving within the section $R_n$ at least partly based on $R_{SCV}$. The processing unit 110 or processing circuitry 410 is also configured to, or may comprise the estimating module 413 being configured to, for each section $R_n$, estimate a first probability distribution, $P_1$, of the energy consumption for the vehicle 100 whilst driving within the section $R_n$ based on $R_{SCV}$, $V_{ECV}$, and a first set of traffic information values, $T_1$, within the section $R_n$. The processing unit 110 or processing circuitry 410 is further configured to, or may comprise the estimating module 413 being configured to, for each section $R_n$, estimate a second probability distribution, $P_2$, of the energy consumption for the vehicle 100 whilst driving within the section $R_n$ based on $R_{SCV}$, $V_{ECV}$, and a second set of traffic information values, $T_2$, within the section $R_n$. Furthermore, the processing unit 110 or processing circuitry 410 is further configured to, or may comprise the estimating module 413 being configured to, for each section $R_n$, estimate a traffic flow indicator, $I_{TF}$, for the section $R_n$ based on $R_{SCV}$, $V_{ECV}$ and a third set of traffic information values, $T_3$, within the section $R_n$. Additionally, the processing unit 110 or processing circuitry 410 is further configured to, or may comprise the determining module 414 being configured to, for each section $R_n$, determine a route section probability distribution, $P_{RS}$, of the energy consumption for the vehicle 100 whilst driving within the section $R_n$ based on the relation between $I_{TF}$, $P_1$, and $P_2$. Finally, the processing unit 110 or processing circuitry 410 is also configured to, or may comprise the determining module 414 being configured to, determine a route probability distribution, $P_R$, of the energy consumption for the vehicle 100 whilst driving along the route R based on the estimated $P_{RS}$ for all sections $R_n$.

In some embodiments, the processing unit 110 or processing circuitry 410 may be configured to, or may comprise the determining module 414 being configured to, determine one or more range estimations having a determined level of reliability for the vehicle 100 along the route R based on the estimated $P_R$. Further, the processing unit 110 or processing circuitry 410 may be configured to, or may comprise the estimating module 413 being configured to, estimate $P_1$, $P_2$ and $I_{TF}$ by determining an expected value and a variance value for the energy consumption for the vehicle 100 by adding uncertainty values for one or more of $R_{SCV}$ and $V_{ECV}$, as well as, $T_1$, $T_2$, and $T_3$, respectively.

In some embodiments, $R_{SCV}$ may comprise one or more of: one or more road resistance values within the section $R_n$, one or more road weather condition values within the section $R_n$, one or more road reference speed values within the section $R_n$, and a travel time for the section $R_n$. Also, in some embodiments, $T_1$ may comprise one or more of: one or more speed limitations set within the section $R_n$, one or more static traffic rules applied within the section $R_n$, one or more speed bump occurrences within the section $R_n$, traffic intensity values within the section $R_n$ indicating a best case scenario according to previously stored traffic intensity values for the section $R_n$, speed average values of vehicles within the section $R_n$ indicating a best case scenario according to previously stored speed average values for the section $R_n$, and speed variance values of vehicles within the section $R_n$ indicating a best case scenario according to previously stored speed variance values for the section $R_n$. According to some embodiments, $T_2$ may comprise one or more of: traffic intensity values within the section $R_n$ indicating a worst case scenario according to previously stored traffic intensity values for the section $R_n$, speed average values of vehicles within the section $R_n$ indicating a worst case scenario according to previously stored speed average values for the section $R_n$, and speed variance values of vehicles within the section $R_n$ indicating a worst case scenario according to previously stored speed variance values for the section $R_n$. Here, according to some embodiments, the best case scenario may be represented by a combination of one or more of the lowest traffic intensity values, the highest speed average values, and the lowest speed variance values, and the worst case scenario may be represented by a combination of one or more of the highest traffic intensity values, the lowest speed average values, and the highest speed variance values. In some embodiments, $T_3$ may comprise one or more of: an estimated traffic value for the section $R_n$ indicating the current traffic situation in the section $R_n$, an estimated current travel time for the section $R_n$, and one or more additional estimated traffic values for the section $R_n$ indicating previous traffic situations in the section $R_n$.

Furthermore, the processing unit 110 or processing circuitry 410 may be configured to, or may comprise the obtaining module 412 being configured to, obtain one or more of $R_{SCV}$, $T_1$, $T_2$, and $T_3$ from a remote server 130 accessible via wireless communications network. In some embodiments, $V_{ECV}$ may comprise one or more of: characteristic values of the vehicle 100 that will impact the energy consumption of the vehicle 100 whilst driving within the section $R_n$, and energy consumption values of auxiliary systems on-board the vehicle 100. Further, the characteristic values of the vehicle 100 comprises one or more of: a mass value of the vehicle 100, tire characteristic values of the vehicle 100, aerodynamic values of the vehicle 100, and characteristic values of powertrain of the vehicle 100. According to some embodiments, the processing unit 110 may be located in a server 103 accessible via wireless network. In this case, the processing unit 110 or processing circuitry 410 is configured to, or may comprise the obtaining module 412 being configured to, transmit the determined one or more range estimations to the vehicle 100.

Furthermore, the embodiments for enabling reliable range estimations for a vehicle 100 along a route R from a source location S to a target destination T described above may be at least partly implemented through one or more processors, such as, the processing circuitry 410 in the processing unit 110 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the processing unit 110. The data carrier, or computer readable medium, may be one of an electronic signal, optical signal, radio signal or computer-readable storage medium. The computer program code may e.g. be provided as pure program code in the processing unit 110 or on a server and downloaded to the processing unit 110. Thus, it should be noted that the functions of the processing unit 110 may in some embodiments be implemented as computer programs stored in memory 420 in FIG. 4, e.g. a computer readable storage unit, for execution by processors or processing modules, e.g. the processing circuitry 410 in the processing unit 110 of FIG. 4.

Those skilled in the art will also appreciate that the processing circuitry 410 and the memory 420 described above may refer to a combination of analog and digital circuits, and/or one or more processors configured with software and/or firmware, e.g. stored in a memory, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems and computer program products. It should be appreciated that the example embodiments presented herein may be practiced in any combination with each other. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware. It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method performed by a processing unit for enabling reliable range estimations for a vehicle along a route from a source location to a target destination, wherein the method comprise:
   segmenting the route into a plurality of sections;
   for each section:
      obtaining a set of route section characteristic values, $R_{SCV}$, that will impact the energy consumption of the vehicle whilst driving within the section,
      obtaining a set of vehicle energy consumption values, $V_{ECV}$, that will impact the energy consumption of the vehicle whilst driving within the section at least partly based on $R_{SCV}$,
      estimating a first probability distribution, $P_1$, of the energy consumption for the vehicle whilst driving within the section based on $R_{SCV}$, $V_{ECV}$, and a first set of traffic information values, $T_1$, within the section,
      estimating a second probability distribution, $P_2$, of the energy consumption for the vehicle whilst driving within the section based on $R_{SCV}$, $V_{ECV}$, and a second set of traffic information values, $T_2$, within the section,
      estimating a traffic flow indicator, $I_{TF}$, for the section based on $R_{SCV}$, $V_{ECV}$ and a third set of traffic information values, $T_3$, within the section, and
      determining a route section probability distribution, $P_{RS}$, of the energy consumption for the vehicle whilst driving within the section based on the relation between $P_1$, $P_2$, and $I_{TF}$;
   determining a route probability distribution, $P_R$, of the energy consumption for the vehicle whilst driving along the route based on the estimated $P_{RS}$ for all sections;
   determining one or more range estimations having a determined level of reliability for the vehicle along the route based on the estimated $P_R$;
   using the one or more range estimations to determine an expected range; and
   indicating the expected range to a driver of the vehicle.

2. The method according to claim 1, wherein the estimation of P1, P2 and ITF comprise determining an expected value and a variance value for the energy consumption for the vehicle by adding uncertainty values for one or more of RSCV and VECV, as well as, T1, T2, and T3, respectively.

3. The method according to claim 1, wherein RSCV comprise one or more of:
one or more road resistance values within the section,
one or more road weather condition values within the section,
one or more road reference speed values within the section, and
a travel time for the section.

4. The method according to claim 1, wherein T1 comprise one or more of:
one or more speed limitations set within the section,
one or more static traffic rules applied within the section,
one or more speed bump occurrences within the section,
traffic intensity values within the section indicating a best case scenario according to previously stored traffic intensity values for the section,
speed average values of vehicles within the section indicating a best case scenario according to previously stored speed average values for the section, and
speed variance values of vehicles within the section indicating a best case scenario according to previously stored speed variance values for the section, wherein the best case scenario is represented by a combination of one or more of the lowest traffic intensity values, the highest speed average values, and the lowest speed variance values.

5. The method according to claim 1, wherein T2 comprise one or more of:
traffic intensity values within the section indicating a worst case scenario according to previously stored traffic intensity values for the section,
speed average values of vehicles within the section indicating a worst case scenario according to previously stored speed average values for the section, and
speed variance values of vehicles within the section indicating a worst case scenario according to previously stored speed variance values for the section, wherein the worst case scenario is represented by a combination of one or more of the highest traffic intensity values, the lowest speed average values, and the highest speed variance values.

6. The method according to claim 1, wherein T3 comprise one or more of:
an estimated traffic value for the section indicating the current traffic situation in the section,
an estimated current travel time for the section, and
one or more additional estimated traffic values for the section indicating previous traffic situations in the section.

7. The method according to claim 1, wherein one or more of RSCV, T1, T2, and T3 are obtained from a remote server accessible via wireless communications network.

8. The method according to claim 1, wherein VECV comprise one or more of:
characteristic values of the vehicle that will impact the energy consumption of the vehicle whilst driving within the section, and
energy consumption values of auxiliary systems on-board the vehicle.

9. The method according to claim 8, wherein the characteristic values of the vehicle comprises one or more of:
a mass value of the vehicle,
tire characteristic values of the vehicle,
aerodynamic values of the vehicle, and
characteristic values of powertrain of the vehicle.

10. The method according to claim 1, wherein the processing unit is located in a remote server accessible via wireless network.

11. The method according to claim 10, further comprising transmitting the determined one or more range estimations to the vehicle.

12. A processing unit for enabling reliable range estimations for a vehicle along a route from a source location to a target destination, wherein the processing unit is configured to:
segment the route into a plurality of sections, and
for each section, obtain a set of route section characteristic values, RSCV, that will impact the energy consumption of the vehicle whilst driving within the section, obtain a set of vehicle energy consumption values, VECV, that will impact the energy consumption of the vehicle whilst driving within the section at least partly based on RSCV, estimate a first probability distribution, P1, of the energy consumption for the vehicle whilst driving within the section based on RSCV, VECV, and a first set of traffic information values, T1, within the section, estimate a second probability distribution, P2, of the energy consumption for the vehicle whilst driving within the section based on RSCV, VECV, and a second set of traffic information values, T2, within the section, estimate a traffic flow indicator, ITF, for the section based on RSCV, VECV and a third set of traffic information values, T3, within the section, and determine a route section probability distribution, PRS, of the energy consumption for the vehicle whilst driving within the section based on the relation between ITF, P1, and P2, and also
determine a route probability distribution, PR, of the energy consumption for the vehicle whilst driving along the route based on the estimated PRS for all sections,
determine one or more range estimations having a determined level of reliability for the vehicle along the route based on the estimated PR,
use the one or more range estimations to determine an expected range, and
cause the expected range to be indicated to a driver of the vehicle.

13. A non-transitory computer program carrier storing program code for performing the steps of claim 1 when said program code is run on a computer or in a processing circuitry.

14. The computer program carrier according to claim 13, wherein the computer program carrier is a computer-readable storage medium.

15. A vehicle comprising processing unit according to claim 12.

* * * * *